W. F. DAWSON.
SUPPORT FOR END TURNS OR CONNECTIONS OF COILS FOR DYNAMO ELECTRIC MACHINES.
APPLICATION FILED JAN. 30, 1907.

1,064,295.

Patented June 10, 1913.

3 SHEETS—SHEET 1.

WITNESSES:

INVENTOR
WILLIAM F. DAWSON.
BY
ATT'Y.

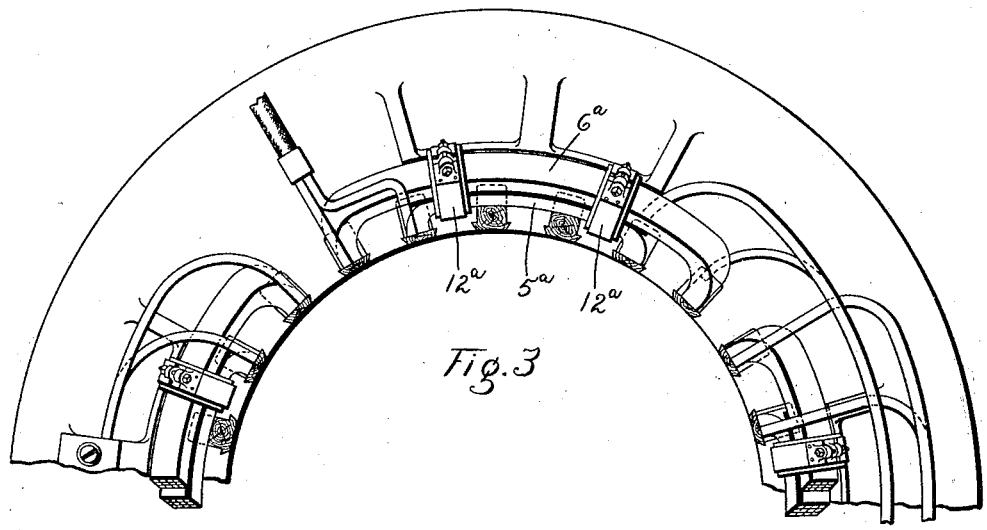
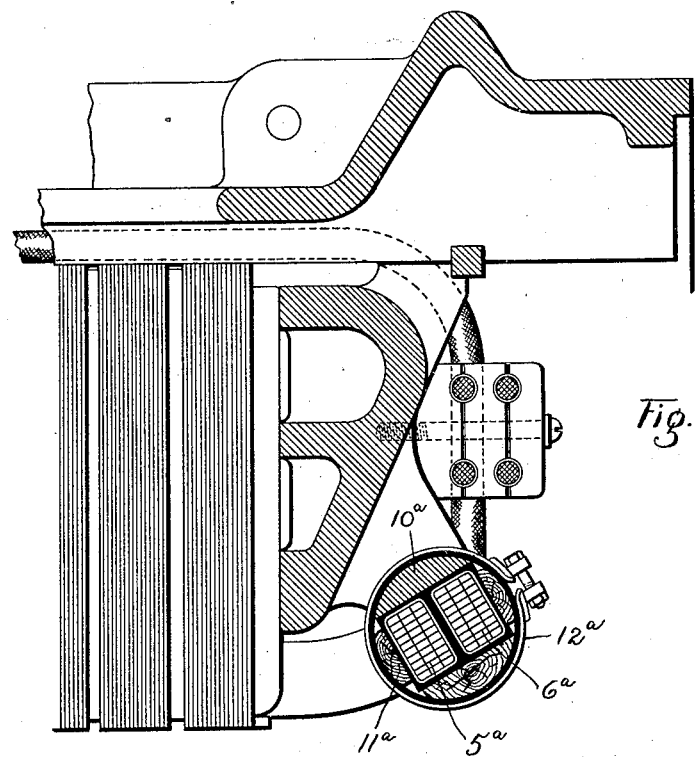

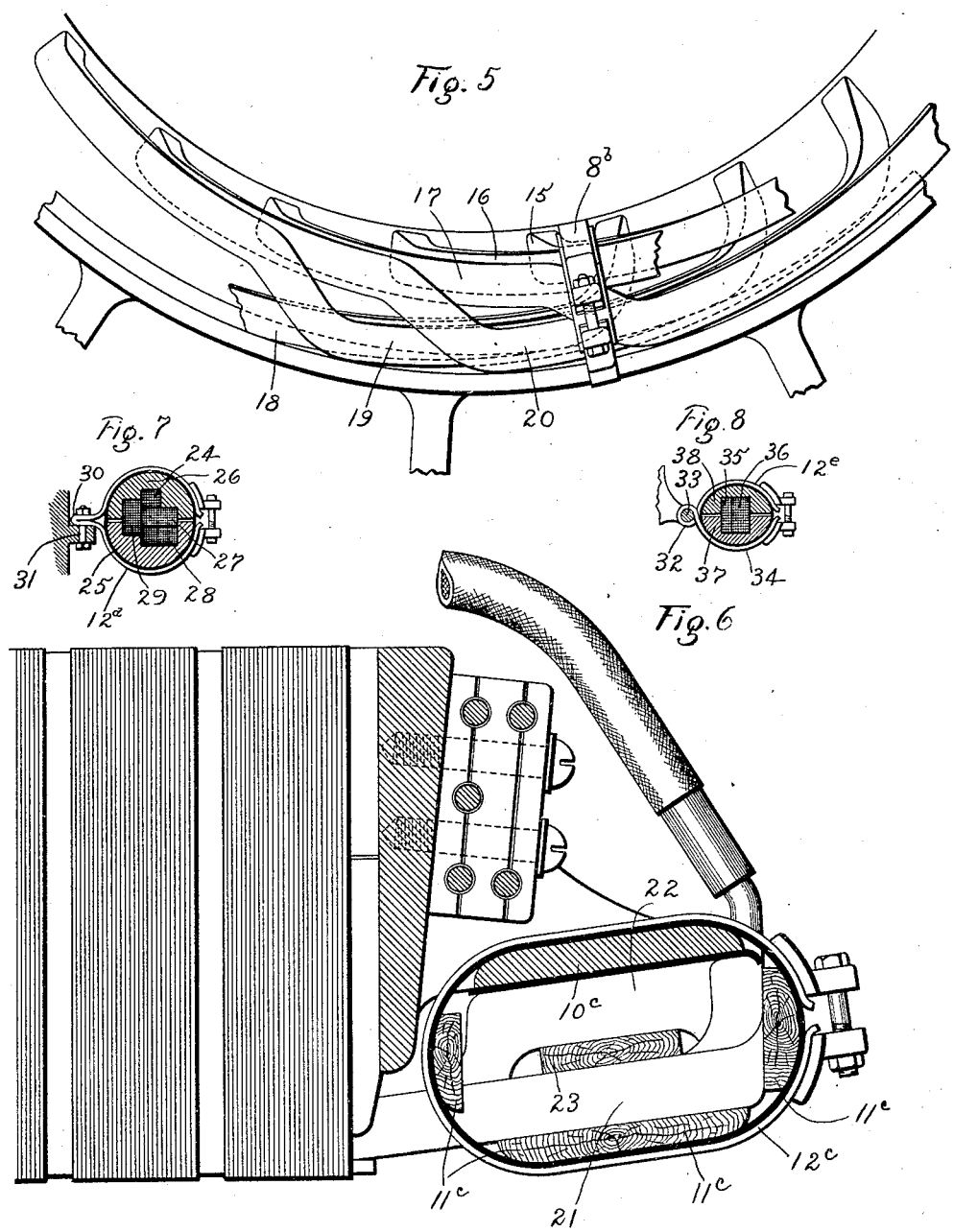

UNITED STATES PATENT OFFICE.

WILLIAM F. DAWSON, OF RUGBY, ENGLAND, ASSIGNOR TO GENERAL ELECTRIC COMPANY, A CORPORATION OF NEW YORK.

SUPPORT FOR END TURNS OR CONNECTIONS OF COILS FOR DYNAMO-ELECTRIC MACHINES.

1,064,295.   Specification of Letters Patent.   Patented June 10, 1913.

Application filed January 30, 1907. Serial No. 354,830.

*To all whom it may concern:*

Be it known that I, WILLIAM F. DAWSON, a citizen of the United States, residing at Rugby, England, have invented certain new and useful Improvements in Supports for End Turns or Connections of Coils for Dynamo-Electric Machines, of which the following is a specification.

My invention relates to dynamo-electric machines and more particularly to means for supporting and securing the end turns or connections which project beyond the core bodies of the stators or rotors of large dynamo-electric machines, and it has for its object to provide a simple arrangement whereby such end turns or connections, no matter what forms they may assume, may be rigidly secured in a simple and convenient manner, and furthermore, so as to provide adequate ventilation.

My invention therefore consists in certain novel features of construction and arrangement of parts to be hereinafter particularly pointed out in the claims.

For a full understanding of the invention and its various objects and advantages, reference may be had to the following detailed description taken in connection with the accompanying drawing, wherein—

Figure 1:
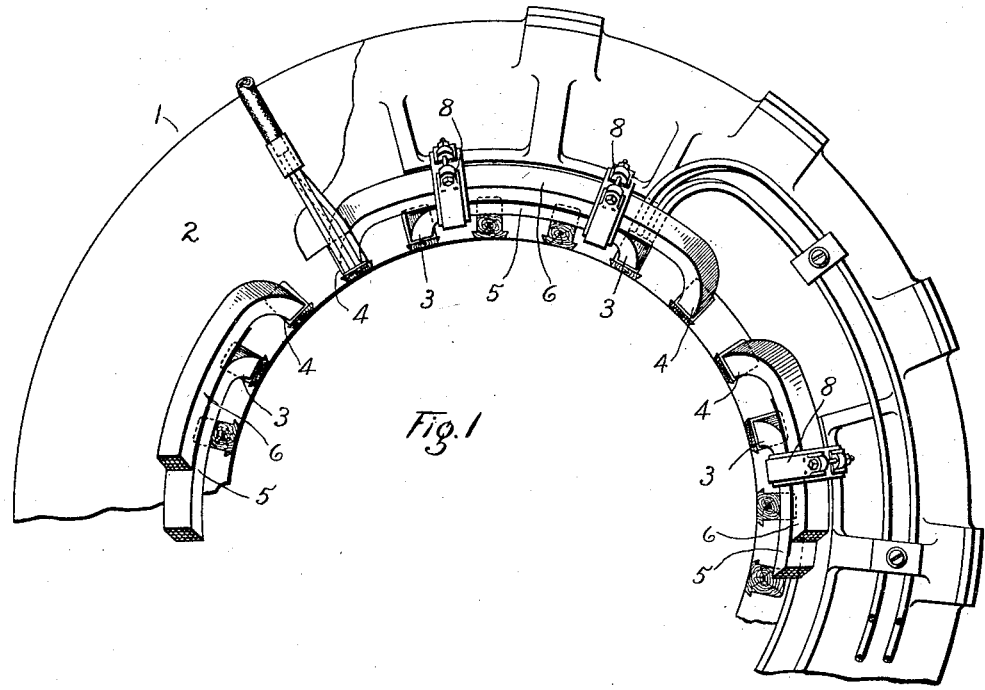
Figure 2:
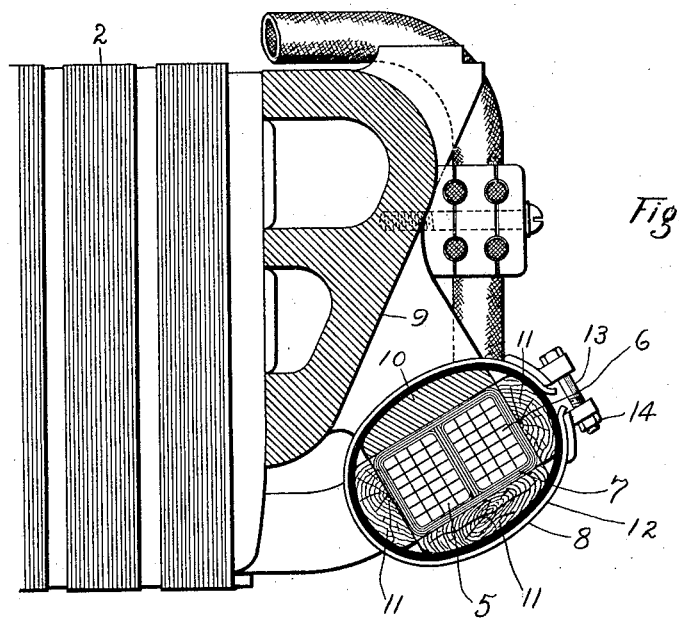

Figure 1 shows in side elevation a portion of a dyanmo-electric machine element having its end turns or connections supported in accordance with one form of my invention; Fig. 2 is an enlarged radial section taken through the member shown in Fig. 1; Figs. 3 and 4 are views corresponding to Figs. 1 and 2 showing further modifications; Figs. 5 and 6 are also views corresponding to Figs. 1 and 2 representing still further modifications; and Figs. 7 and 8 are detail views showing other modifications.

Referring to Figs. 1 and 2, 1 represents a dynamo-electric machine element consisting of a laminated core 2 having conductors or coils 3 and 4 arranged in the usual way in slots formed in the core. 5 and 6 represent the end turns of the conductors or coils 3 and 4, respectively. The end turns 5 are overlapped by the turns 6, and in accordance with the present invention each group of overlapping turns is secured in place independently of other groups. To this end the several members of each group are first securely fastened together at one or more points, as by means of one or more layers of tape or other suitable binding material 7. A clamping device 8, arranged to firmly press the coils together, is then put in position about each taped portion. This device may conveniently consist of clamping jaws formed of blocks of wood or other insulating material having therein or forming with each other a recess of the same shape as the cross-section of the group of conductors, together with a binding member adapted to tie them together with the conductors firmly clamped in the recess. The cross section of the group of coils may be very irregular and may vary at different points in the same group, but since the recesses or openings in the clamping devices are shaped to suit the particular locations in which the devices are to be placed, and since each clamping device is adjustable independently of the others, a perfectly secure and rigid connection may be obtained at all points. Furthermore, an even distribution of pressure is obtained on all sides of the conductors.

Since it is necessary to anchor the end turns or connections to the rigid core, I prefer to use the binding member of the clamping device both for the purpose of clamping the conductors of each group together and for simultaneously clamping the group as a whole to the rigid portions of the machine, although the securing of the parts to the frame of the machine may be done in other ways. To this end the end plates 9 may conveniently be provided with brackets 10 each of which preferably co-operates with one or more pieces of wood or other material 11, in the manner described, to form clamping jaws between which the conductors are held. The binding member may consist of a resilient or flexible band 12 having its ends connected by a screw-threaded member such as bolt 13. It will be seen that by screwing up the nut 14 on the bolt 13 a uniformly distributed pressure is exerted upon the jaws to tightly draw them in place against the conductors, thereby uniting the clamping jaws and the conductors into one rigid unit, and at the same time rigidly joining them to the frame-work of the machine.

In Figs. 3 and 4, substantially the same arrangement of parts is shown as in Figs. 1 and 2 except that the proportions of the parts are such as to cause the jaw members 10ª and 11ª, which surround the conductors 5ª and 6ª, to present a cylindrical periphery; the clamping band 12ª being in the form of a circular ring.

In Fig. 5, the clamp 8ᵇ serves to hold in place six end conductors, 15–20.

In Fig. 6, a construction adapted for another arrangement of end turns is illustrated. Thus, the end turns 21 and 22 are so formed that they do not lie flat one upon the other. A block of wood or other material, 23, is therefore inserted between these end turns so as to form with them a rigid mass which may then be clamped to the bracket 10ᶜ by means of the clamping band 12ᶜ and the jaw members 11ᶜ.

In Fig. 7 the clamping jaws consist of two blocks 24 and 25 having registering recesses which hold the coils 26—29. The binding band 12ᵈ is bent so as to form a lip 30 which is bolted or otherwise fastened to a lug 31 projecting from a rigid portion of the machine.

In Fig. 8 the binding member 12ᵉ is in the form of an 8, one loop 32 of which, the smaller, surrounds a lug or projection 33 extending from the core member, while the other loop 34 acts to clamp the conductors 35 and 36 between the jaws 37 and 38.

It will thus be seen that all of the end turns of dynamo-electric machines may be securely fastened in place so as to form rigid structures with the core bodies irrespective of the number of such turns, their sizes, or the manner in which they are distributed.

In the case of very high potential machines in which the clamping bands such as 8 in Figs. 1 and 2 become statically charged inductively from the windings and discharge to the frame of the machine, it is desirable to ground these clamping bands by connecting them electrically to the frame in any suitable manner. In the forms of my invention shown in Figs. 7 and 8 the bands are grounded by direct attachment to the frame.

What I claim as new and desire to secure by Letters Patent of the United States, is,

1. In a dynamo-electric machine, a frame member having projecting coil supporting portions, coils having end turns or connections arranged in groups, and means for securing said end turns or connections comprising independent clamping devices engaging the members of each group and said projecting portions of the frame member at one or more points and having jaws recessed to fit the conductors of the groups to which they are applied.

2. In a dynamo-electric machine, coils having end turns or connections, a frame member adjacent thereto, and clamping devices for securing said end turns or connections to said frame member, said clamping devices surrounding said frame member and said end turns and locking them rigidly together.

3. In a dynamo-electric machine, coils having end turns or connections arranged in groups, frame members, and means for securing said end turns or connections, said means consisting of a clamping device for each group forming with one of the frame members a pocket in which the conductors of the group are firmly locked.

4. In a dynamo-electric machine, coils having end turns or connections, a frame member, and a device for holding in place said end connections consisting of blocks having an aperture conforming to the cross-sectional shape of a bunch of said connections formed in them and a metallic strap for holding said blocks together so as to apply a uniform pressure to the surface of the connections, said metallic strap being fastened to said frame member.

5. In a dynamo-electric machine, a bracket rigidly attached to said machine, coils having end turns or connections, and a device for holding in place said end connections consisting of blocks having an aperture conforming to the cross-sectional shape of a bunch of said connections formed in them, and a metallic strap for holding said blocks together so as to apply a uniform pressure to the surface of the connections, said metallic strap being secured to said bracket.

In witness whereof, I have hereunto set my hand this fifteenth day of December, 1906.

WILLIAM F. DAWSON.

Witnesses:
 CHARLES H. FULLER,
 J. A. FOSTER.